(12) United States Patent
Heider

(10) Patent No.: US 6,481,075 B1
(45) Date of Patent: Nov. 19, 2002

(54) DOWNSTREAM GUIDE FOR PEELING MACHINE

(75) Inventor: Friedrich Heider, Solingen (DE)

(73) Assignee: SMS Eumuco GmbH, Leverkusen (DE)

(*) Notice: Subject to any disclaimer, the term of this patent is extended or adjusted under 35 U.S.C. 154(b) by 79 days.

(21) Appl. No.: 09/709,747

(22) Filed: Nov. 9, 2000

(30) Foreign Application Priority Data

Nov. 11, 1999 (DE) .......................................... 199 54 118

(51) Int. Cl.[7] .............................................. B21B 45/04
(52) U.S. Cl. ..................................... 29/81.05; 29/81.11
(58) Field of Search .......................... 82/164; 29/81.05, 29/33 T, 33 D, 81.04, 81.12, 81.11; 72/39, 40, 428; 409/139, 140, 298, 199, 143

(56) References Cited

U.S. PATENT DOCUMENTS

| | | | |
|---|---|---|---|
| 1,192,536 A | * | 7/1916 | Latshaw |
| 2,635,393 A | * | 4/1953 | Barth |
| 3,103,840 A | * | 9/1963 | Beacom |
| 4,443,142 A | * | 4/1984 | Blaimschein |
| 4,638,655 A | * | 1/1987 | Sebastian et al. |

FOREIGN PATENT DOCUMENTS

| | | | |
|---|---|---|---|
| DE | 1074360 | | 1/1960 |
| DE | 3044174 | * | 11/1980 |
| DE | 4122948 | | 1/1993 |
| EP | 0 462 322 | | 12/1991 |

* cited by examiner

*Primary Examiner*—S. Thomas Hughes
*Assistant Examiner*—Steven Blount
(74) *Attorney, Agent, or Firm*—Herbert Dubno; Andrew Wilford

(57) ABSTRACT

A peeling machine through which a rod workpiece is moved along a workpiece axis has upstream and downstream guides centering the workpiece on the axis is and axially flanking a rotary scraper engaging the workpiece and carried on an upstream end of a scraper tube coaxially surrounding the downstream guide and rotatable about the workpiece axis. The downstream guide has a stationary tubular housing extending coaxially in the rotatable scraper tube, a plurality of shafts pivotal in the tubular housing about respective guide axes angularly spaced about the workpiece axis, and respective axially elongated guide bars fixed on the shafts, extending axially therealong generally a full length of the scraper tube, and projecting radially of the guide axes therefrom. Guide elements—rollers or blocks—carried on the bars are engageable radially of the workpiece axis with the workpiece.

5 Claims, 3 Drawing Sheets

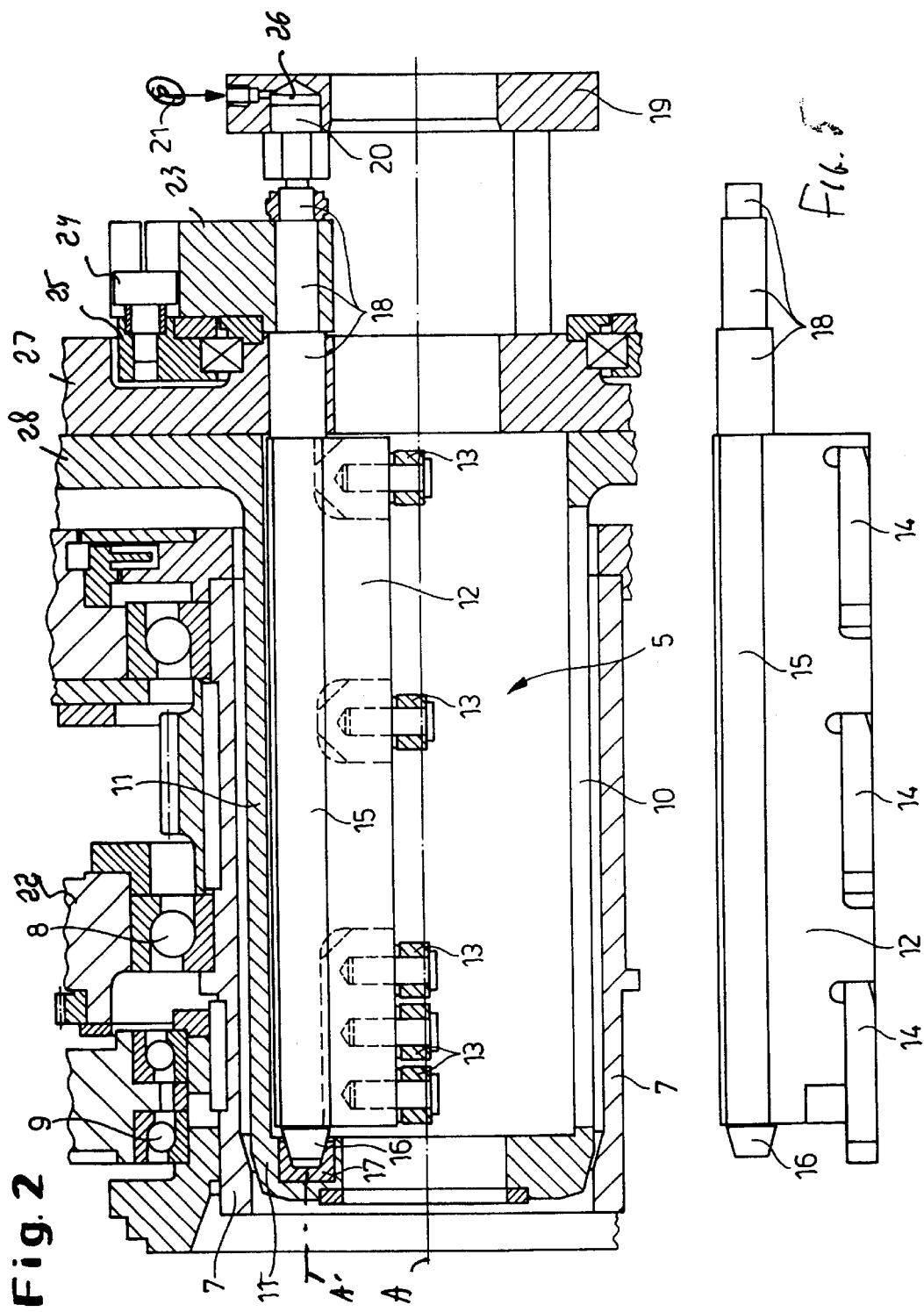

DOWNSTREAM GUIDE FOR PEELING MACHINE

FIELD OF THE INVENTION

The present invention relates to a peeling machine. More particularly this invention concerns a downstream guide for such a machine.

BACKGROUND OF THE INVENTION

As described in European patent document 0,462,322 of Glomb et al, a peeling machine for stripping mill scale and the like from a rod which may be tubular comprises an upstream guide, a central rotary scraper, a downstream guide, and a feeder for advancing the rod along its axis through the guides and scraper. The upstream feeder comprises a plurality of rollers bearing radially upstream of the scraper against the unscraped workpiece, and the downstream feeder can comprise another such array of rollers or slide blocks bearing radially against the scraped workpiece downstream of the scraper. The feeder has a plurality of jaws or rollers that are normally located downstream of the downstream guide and that pull the rod through the machine. The scraper itself comprises at least one scraping tool that is orbited about the axis between the two guides so as to cut an outer layer off the rod workpiece.

The guides need to hold the workpiece as steady as possible which is a fairly difficult task as it is moving longitudinally while being engaged forcefully in a radial direction by the tool or tools of the rotary scraper head. In particular the rapidly rotating scraper must not set the workpiece vibrating such that the scraper digs excessively into it. The guides must damp this vibration as much as possible.

The scraper is normally carried at the upstream end of a tube centered on and rotatable about the workpiece axis. A fixed tubular housing projects upstream into the scraper tube. Five downstream guide elements are mounted on the tubular housing at an upstream end thereof and directly engage the workpiece after it leaves the scraper. Such a downstream guide is not rigid enough to prevent the workpiece from vibrating, so that the scraper can dig into and damage it.

OBJECTS OF THE INVENTION

It is therefore an object of the present invention to provide an improved downstream guide for a rod-peeling machine.

Another object is the provision of such an improved downstream guide for a rod-peeling machine which overcomes the above-given disadvantages, that is which substantially eliminates vibration in the rod so that the scraper can cut the rod to a perfectly cylindrical shape.

SUMMARY OF THE INVENTION

A peeling machine through which a rod workpiece is moved along a workpiece axis has upstream and downstream guides centering the workpiece on the axis and axially flanking a rotary scraper engaging the workpiece and carried on an upstream end of a scraper tube coaxially surrounding the downstream guide and rotatable about the workpiece axis. The downstream guide has a stationary tubular housing extending coaxially in the rotatable scraper tube, a plurality of shafts pivotal in the tubular housing about respective guide axes angularly spaced about the workpiece axis, and respective axially elongated guide bars fixed on the shafts, extending axially therealong generally a full length of the scraper tube, and projecting radially of the guide axes therefrom. Guide elements—rollers or blocks—carried on the bars are engageable radially of the workpiece axis with the workpiece.

Since the guide bars are not set in cutouts of the tube, but instead are mounted internally and extend a good distance in the inner tubular housing, the structure is very stiff and the workpiece will be held solidly at the center. The tubular housing, which is formed between its ends with a narrow axially extending and radially throughgoing slot so that chips and the like do not collect in it, is itself very rigid. What is more, the guide elements carried on the bars engage the workpiece along almost the full length of the scraper tube so that the workpiece is held carefully on the main axis of the machine for vibration-free scraping. Furthermore, since the guide bars and elements are all mounted on the tubular housing, it is possible to remove the entire downstream guide as a single unit for servicing or replacement.

According to the invention the shafts each have an upstream-tapering upstream end and the tubular housing is formed with complementary downstream-flaring seats receiving the upstream shaft ends. A hydraulic biasing system can press the upstream shaft ends upstream into the respective seats and thereby lock angular positions of the shafts and guide bars relative to the guide axes. More particularly the shafts each have downstream ends journaled in a housing of the machine and formed as pistons. The hydraulic biasing unit includes cylinders on the machine housing in which the pistons are axially slidable and means for pressurizing the cylinders and thereby axially pressing and wedging the shaft upstream ends into the respective seats, much like a collet.

BRIEF DESCRIPTION OF THE DRAWING

The above and other objects, features, and advantages will become more readily apparent from the following description, reference being made to the accompanying drawing in which:

FIG. 2 is a large-scale view of a detail of FIG. 1;

FIG. 5 is a side view of the downstream guide element of FIGS. 4a and 4b.

SPECIFIC DESCRIPTION

Figure 1:
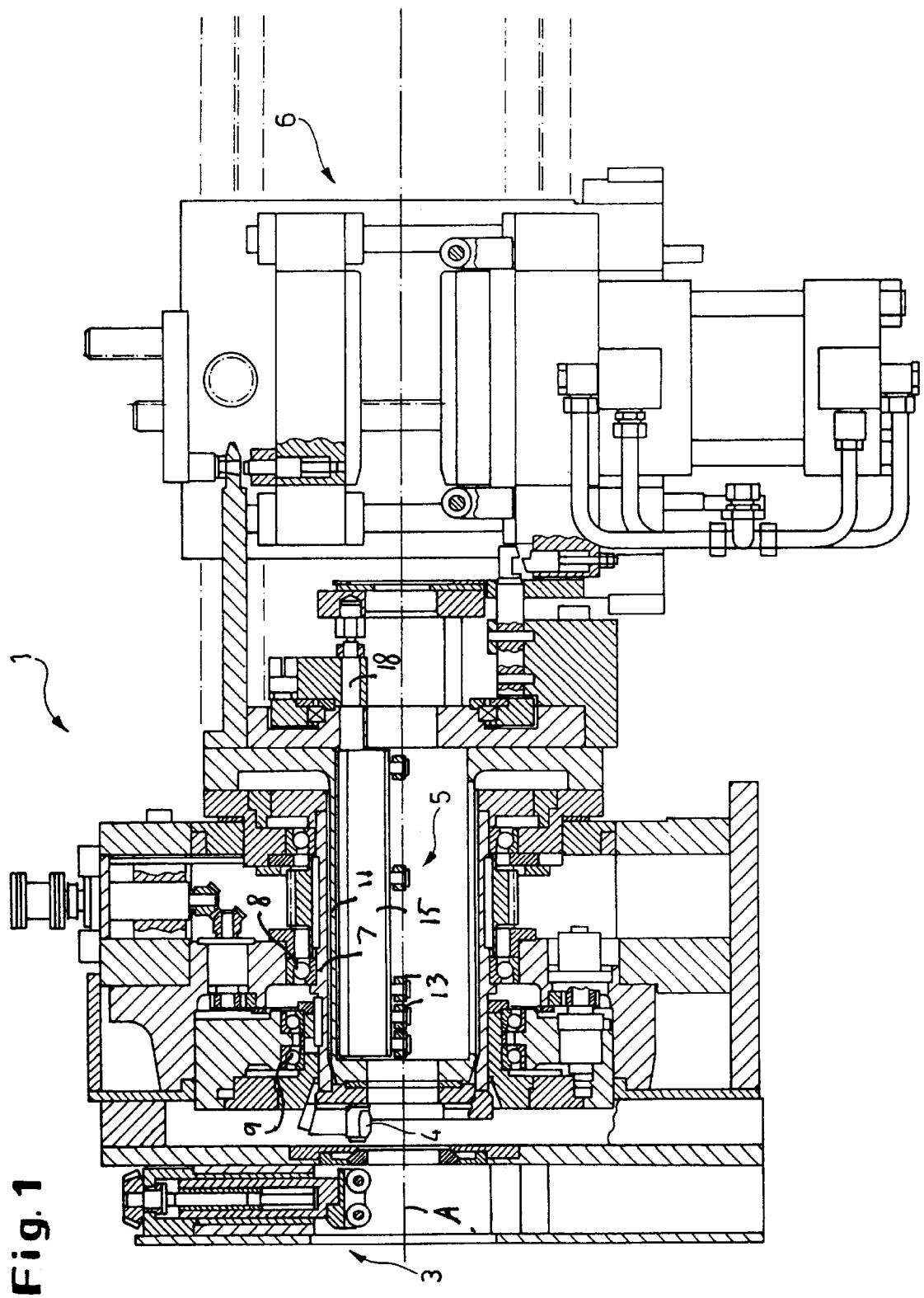
FIG. 1 is a vertical axial section through a peeling machine according to the invention.
Figure 3A:
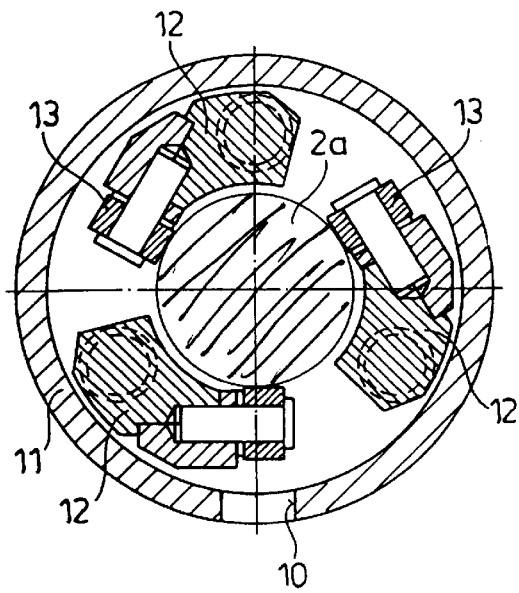
FIGS. 3a and 3b show the downstream guide engaging a large- and a small-diameter workpiece.
Figure 3B:
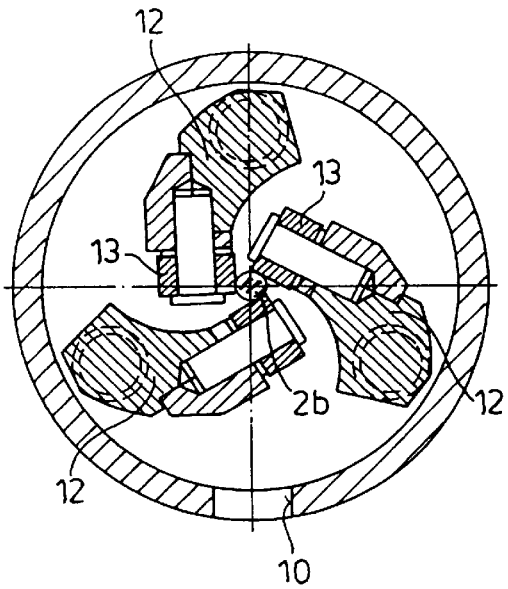

As seen in FIG. 1 a peeling machine 1 for a large-diameter rod workpiece 2a (FIG. 3a) or a small-diameter workpiece 2b (FIG. 3b) basically comprises an upstream guide 3, a scraper 4, a downstream guide 5, and a longitudinal steptype feeder 6. The workpiece 2a or 2b advances along a main or workpiece axis A through the machine 1 while as is standard the scraper 4 orbits about this axis A and removes an outer layer from the workpiece 2a or 2b. The scraper 4 is carried on the upstream end of a tube shaft 7 (see FIG. 2) supported by bearings 8 and 9 in a housing 22 of the machine 1 for rotation about the main axis A by an unillustrated drive.

Figure 4A:
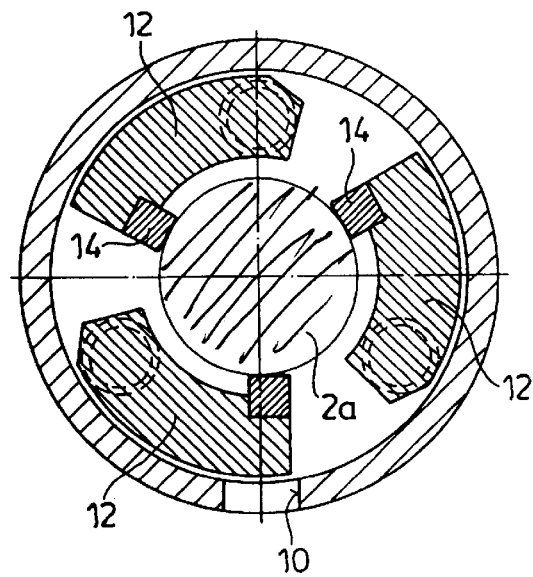
FIGS. 4a and 4b are views similar to FIGS. 4a and 4b but showing an alternative form of the invention.
Figure 4B:
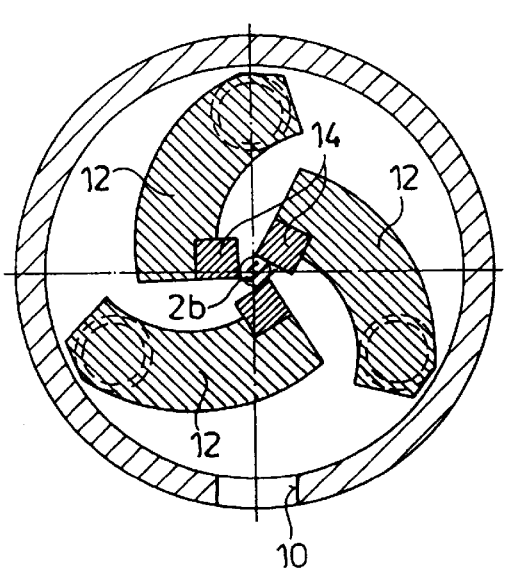

The downstream guide 5 is carried in a tubular housing 11 fitting coaxially inside the tube shaft 7, fixed on the machine housing 22, and formed with a downwardly open axially extending slot 10. Three elongated cast-metal guide bars 12 formed as flippers pivotal about guide axes A' parallel to the main axis A each carry either a plurality of rollers 13 (FIGS. 2, 3a, and 3b) or guide blocks 14 (FIGS. 4a, 4b, and 5) that bear radially inward on the workpiece 2a or 2b. The rollers 13 rotate about axes extending generally tangentially of the workpiece 2a or 2b and have cylindrical outer surfaces bearing in point contact on the workpiece 2a or 2b. The guide blocks 14 are of square section and are axially elongated and have planar inner faces bearing in line contact on the workpiece 2a or 2b.

Each of the bar-like guide bars 12 is carried on a respective shaft 15 extending parallel to the main axis A and having an upstream or front end 16 of frustoconical shape fitted in a respective frustoconical seat 17 formed in the front end of the tubular guide housing 11, and a rear end formed as a stepped shaft 18 journaled in a plate 27 fixed to a flange 28 at the downstream of the tube housing 11. Each shaft 18 has a downstream end formed as a piston 20 engaged in a chamber 26 pressurizable from a source indicated schematically at 21 so as to wedge the front end 16 in the seat 17 and thus lock the position of the flipper-like member 12. The angular position about the guide axis A' is established by radially projecting arms 23 mounted on the shaft ends 18 and engaged by rollers 24 carried on an adjustment ring 25 rotatable about the main axis A in the housing 22.

Thus the angular positions of the bars 12 about the guide axes A' can be set and then locked in place to ensure that the cut-down workpiece 2a or 2b is held perfectly on center on the axis A downstream of the scraper 4. Once the angular position is set by the elements 23, 24, and 25, the axial clamping unit formed by the elements 20, 21, and 26 is engaged to lock the selected position. Since the bars 12 and shafts 15 extend almost the full axial length of the tube shaft 7 and the guide elements 13 and 14 are either distributed along this distance or extend this distance, the entire system is quite rigid and the workpiece 2a or 2b is held on center over enough of its length to substantially eliminate the possibility of radial movement and vibration.

I claim:

1. In a peeling machine through which a rod workpiece is moved along a workpiece axis and having upstream and downstream guides centering the workpiece on the axis and axially flanking a rotary scraper engaging the workpiece and carried on an upstream end of a scraper tube coaxially surrounding the downstream guide and rotatable about the workpiece axis, the improvement wherein the downstream guide comprises:

a stationary tubular housing extending coaxially in the rotatable scraper tube and formed around the axis with a plurality of downstream-flaring seats;

a plurality of shafts pivotal in the tubular housing about respective guide axes angularly spaced about the workpiece axis and having upstream-tapering upstream ends engageable in the respective seats respective axially elongated guide bars fixed on the shafts, extending axially therealong generally a full length of the scraper tube, and projecting radially of the guide axes therefrom;

hydraulic means on the downstream guide for pressing the upstream shaft ends upstream into the respective seats and thereby locking angular position of the shafts and guide bars relative to the guide axes; and guide elements carried on the bars and radially engageable of the workpiece axis with the workpiece.

2. The peeling-machine downstream guide defined in claim 1 wherein the shafts each have downstream ends journaled in a housing of the machine and forming pistons, the hydraulic means including:

respective cylinders on the machine housing in which the pistons are axially slidable, and means for pressurizing the cylinders and thereby axially pressing the shaft upstream ends into the respective seats.

3. The peeling-machine downstream guide defined in claim 1 wherein the tubular housing is formed with an axially extending and radially throughgoing slot.

4. The peeling-machine downstream guide defined in claim 1 wherein the guide elements include a plurality of rollers carried on each of the guide bars.

5. The peeling-machine downstream guide defined in claim 1 wherein the guide elements include respective axially elongated guide blocks on the bars.

\* \* \* \* \*